United States Patent
Iwabuchi et al.

(10) Patent No.: US 11,074,670 B2
(45) Date of Patent: Jul. 27, 2021

(54) IMAGE PROCESSING APPARATUS, CONTROL METHOD THEREOF, RECORDING MEDIUM, AND INFORMATION PROCESSING SYSTEM

(71) Applicant: CANON KABUSHIKI KAISHA, Tokyo (JP)

(72) Inventors: Kohei Iwabuchi, Kawasaki (JP); Yuichi Nitto, Sagamihara (JP); Mahoro Anabuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/733,572

(22) Filed: Jan. 3, 2020

(65) Prior Publication Data

US 2020/0226712 A1 Jul. 16, 2020

(30) Foreign Application Priority Data

Jan. 11, 2019 (JP) .............................. JP2019-003610
Oct. 24, 2019 (JP) .............................. JP2019-193639

(51) Int. Cl.
*G06T 3/20* (2006.01)

(52) U.S. Cl.
CPC ..................................... *G06T 3/20* (2013.01)

(58) Field of Classification Search
CPC ....................................................... G06T 3/20
USPC ....................................................... 345/647
See application file for complete search history.

(56) References Cited

U.S. PATENT DOCUMENTS

| | | | | |
|---|---|---|---|---|
| 6,009,212 A | * | 12/1999 | Miller | G06K 9/32 382/131 |
| 6,226,418 B1 | * | 5/2001 | Miller | G06K 9/6206 382/131 |
| 6,408,107 B1 | * | 6/2002 | Miller | G06K 9/6206 382/151 |

(Continued)

FOREIGN PATENT DOCUMENTS

| | | |
|---|---|---|
| CN | 103888741 A | 6/2014 |
| CN | 106023319 A | 10/2016 |

(Continued)

OTHER PUBLICATIONS

Office Action issued in Chinese Appln. No. 201911345205.2 dated Mar. 29, 2021.

*Primary Examiner* — Ryan R Yang
(74) *Attorney, Agent, or Firm* — Rossi, Kimms & McDowell LLP

(57) ABSTRACT

An image processing apparatus designates a first partial region for a first image obtained by rendering a configuration of an object in accordance with a predetermined coordinate system, designates a second partial region corresponding to the first partial region for a second image including an image obtained by capturing the object, and converts an image of the second partial region into an image complying with the predetermined coordinate system based on a coordinate of the first partial region in the first image and a coordinate of the second partial region in the second image. In the designation of the first partial region, different first partial regions in the first image are sequentially designated, and a first partial region at a (k+1)-th time based on a first partial region designated at a k-th time.

19 Claims, 16 Drawing Sheets

(56) References Cited

U.S. PATENT DOCUMENTS

| | | | | |
|---|---|---|---|---|
| 6,633,686 | B1* | 10/2003 | Bakircioglu | G06K 9/6206 382/131 |
| 6,798,921 | B2* | 9/2004 | Kinjo | H04N 1/407 348/14.15 |
| 7,408,629 | B2* | 8/2008 | Qwarfort | G01C 11/06 356/28 |
| 7,778,490 | B2* | 8/2010 | Quist | G06T 7/38 382/294 |
| 7,885,480 | B2* | 2/2011 | Bryll | G06T 7/32 382/278 |
| 8,643,737 | B2* | 2/2014 | Eom | H04N 5/23219 348/222.1 |
| 9,483,816 | B2* | 11/2016 | Smith | G06T 7/00 |
| 9,509,922 | B2* | 11/2016 | Reichert, Jr. | G06T 3/00 |
| 2006/0215935 | A1* | 9/2006 | Oldroyd | G01C 11/00 382/294 |
| 2013/0162681 | A1* | 6/2013 | Peterson | G06T 11/60 345/647 |
| 2015/0138240 | A1* | 5/2015 | Hiranuma | H04N 9/3147 345/634 |
| 2016/0182873 | A1* | 6/2016 | Sumiyoshi | H04N 9/3185 348/747 |
| 2017/0200261 | A1* | 7/2017 | Choi | G06T 7/0012 |
| 2017/0200361 | A1* | 7/2017 | McBride | G01F 25/0061 |
| 2017/0287154 | A1* | 10/2017 | Yamaguchi | G06T 7/73 |
| 2019/0251401 | A1* | 8/2019 | Shechtman | G06T 11/00 |
| 2019/0384992 | A1* | 12/2019 | Tsunematsu | G06K 9/00778 |
| 2020/0177866 | A1* | 6/2020 | Myokan | G06T 7/80 |
| 2020/0273205 | A1* | 8/2020 | Yamashita | G06T 7/80 |
| 2020/0349683 | A1* | 11/2020 | Allu | G06T 5/40 |

FOREIGN PATENT DOCUMENTS

| | | |
|---|---|---|
| CN | 107392951 A | 11/2017 |
| CN | 108269231 A | 7/2018 |
| CN | 108596837 A | 9/2018 |
| CN | 109146781 A | 1/2019 |
| JP | 4112077 B2 | 7/2008 |

* cited by examiner

| 501 | 502 |
|---|---|
| ID | REFERENCE POINT |
| 1 | $p_{d1}$ |
| 2 | $p_{d2}$ |
| 3 | $p_{d3}$ |
| 4 | $p_{d4}$ |

FIG. 5A

| 503 | 504 |
|---|---|
| ID | REFERENCE POINT |
| 1 | $p_{i1}$ |
| 2 | $p_{i2}$ |
| 3 | $p_{i3}$ |
| 4 | $p_{i4}$ |

FIG. 5B

| 505 | 506 |
|---|---|
| ID | CORRESPONDING POINT PAIR |
| 1 | $(p_{d1}, p_{i1})$ |
| 2 | $(p_{d2}, p_{i2})$ |
| 3 | $(p_{d3}, p_{i3})$ |
| 4 | $(p_{d4}, p_{i4})$ |

FIG. 5C

IMAGE PROCESSING APPARATUS, CONTROL METHOD THEREOF, RECORDING MEDIUM, AND INFORMATION PROCESSING SYSTEM

BACKGROUND OF THE INVENTION

Field of the Invention

The present invention relates to an image processing technique of performing ortho-correction.

Description of the Related Art

In conventional inspection of an infrastructure, a defect such as a crack of a structure has been checked visually and written in a front elevation view to form a form. These days, a form is created based on a captured image. In this case, a wall surface of a structure is captured from an opposing position, and the captured image is aligned with a front elevation view. Then, a defect is directly written in the captured image aligned with the front elevation view, forming a form. However, a structure is not always captured from an opposing position owing to a geographical factor or the like.

Japanese Patent No. 4112077 (patent literature 1) discloses a technique of associating a map with a captured image and converting the captured image into a look obtained by capturing from an opposing position on the ground. The image obtained by conversion is called an ortho-image, and conversion processing for obtaining an ortho-image is called ortho-correction processing. An image available for inspection of an infrastructure can be obtained by regarding a map in patent literature 1 as the front elevation view of a structure and using ortho-correction processing.

When a structure surface is a curved surface, like an arch dam wall surface, an ortho-image obtained by the above-described ortho-correction processing includes a distortion undesirably. In this case, a distortion-less image can be obtained by applying ortho-correction processing not to an entire captured image but to a partial region in the captured image. However, the association between the front elevation view and the captured image needs to be performed repetitively for respective partial regions, and the processing becomes cumbersome.

SUMMARY OF THE INVENTION

According to one aspect of the present invention, an image processing apparatus comprises: a first designation unit configured to designate a first partial region for a first image obtained by rendering a configuration of an object in accordance with a predetermined coordinate system; a second designation unit configured to designate a second partial region corresponding to the first partial region for a second image including an image obtained by capturing the object; and a conversion unit configured to convert an image of the second partial region into an image complying with the predetermined coordinate system based on a coordinate of the first partial region in the first image and a coordinate of the second partial region in the second image, wherein the first designation unit is configured to sequentially designate different first partial regions in the first image, and the first designation unit designates a first partial region at a (k+1)th time based on a first partial region designated at a kth time, wherein, k is integer greater than 0.

According to another aspect of the present invention, a method of controlling an image processing apparatus that generates an image complying with a predetermined coordinate system, the method comprises: designating a first partial region for a first image obtained by rendering a configuration of an object in accordance with the predetermined coordinate system; designating a second partial region corresponding to the first partial region for a second image including an image obtained by capturing the object; and converting an image of the second partial region into an image complying with the predetermined coordinate system based on a coordinate of the first partial region in the first image and a coordinate of the second partial region in the second image, wherein in the designating the first partial region, different first partial regions are sequentially designated in the first image, and in the designating the first partial region, a first partial region at a (k+1)th time is designated based on a first partial region designated at a kth time, wherein, k is integer greater than 0.

According to still another aspect of the present invention, a non-transitory computer-readable recording medium storing a program that causes a computer to function as an image processing apparatus comprises: a first designation unit configured to designate a first partial region for a first image obtained by rendering a configuration of an object in accordance with a predetermined coordinate system; a second designation unit configured to designate a second partial region corresponding to the first partial region for a second image including an image obtained by capturing the object; and a conversion unit configured to convert an image of the second partial region into an image complying with the predetermined coordinate system based on a coordinate of the first partial region in the first image and a coordinate of the second partial region in the second image, wherein the first designation unit is configured to sequentially designate different first partial regions in the first image, and the first designation unit designates a first partial region at a (k+1)th time based on a first partial region designated at a kth time, wherein, k is integer greater than 0.

According to yet another aspect of the present invention, an information processing system that detects a defect generated in a wall surface of a structure, the system comprises: a first designation unit configured to designate a first partial region for a first image obtained by rendering the structure in accordance with a predetermined coordinate system; a second designation unit configured to designate a second partial region corresponding to the first partial region for a second image including a captured image obtained by capturing the wall surface of the structure; a conversion unit configured to convert an image of the second partial region into an image complying with the predetermined coordinate system based on a coordinate of the first partial region in the first image and a coordinate of the second partial region in the second image; and a detection unit configured to detect the defect generated in the wall surface of the structure from the image converted by the conversion unit, wherein the first designation unit is configured to sequentially designate different first partial regions in the first image, and the first designation unit designates a first partial region at a (k+1)th time based on a first partial region designated at a kth time, wherein, k is integer greater than 0.

The present invention enables designation of a partial region serving as a processing target region by a simpler operation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5C are tables exemplifying a reference point table and a corresponding point table;

DESCRIPTION OF THE EMBODIMENTS

Figure 1:
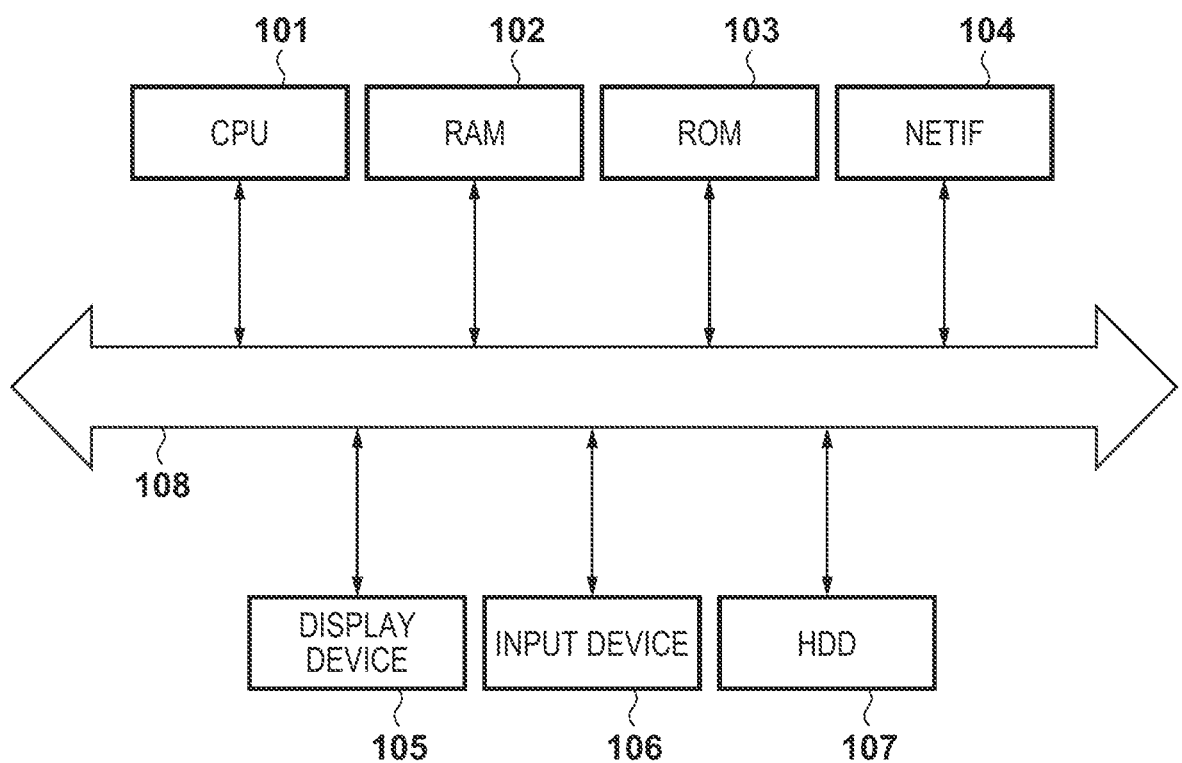
FIG. 1 is a block diagram showing the hardware arrangement of an image processing apparatus according to the first embodiment.

Embodiments of the present invention will be described below in detail with reference to the accompanying drawings. Note that the following embodiments do not limit the claims of the present invention, and not all combinations of features set forth in the embodiments are essential to the present invention. Features set forth in the embodiments may be combined arbitrarily. The same reference numerals denote the same or similar parts and a repetitive description thereof will be omitted.

First Embodiment

An image processing apparatus in which a drawing of a structure serving as an object and a captured image of the structure are input and an ortho-image is generated based on the captured image will be exemplified below as the first embodiment of an image processing apparatus according to the present invention. When a structure cannot be captured from an opposing position, it is captured in a state in which the optical axis of an image capturing apparatus is tilted with respect to the structure. This capturing method is sometimes called tilt capturing. Processing of converting an object image obtained by tilt capturing into a look obtained when the object is captured from an opposing position is sometimes called tilt correction. In this specification, an expression "generation of an ortho-image (ortho-correction)" includes all processes of converting an image captured in a state in which the optical axis of an image capturing apparatus is tilted with respect to an object, regardless of a specific conversion method, and reproducing a look from a position opposing the object.

<Apparatus Arrangement>

FIG. 1 is a block diagram showing the hardware arrangement of an image processing apparatus according to the first embodiment.

A central processing unit (CPU) 101 controls a computer system. The CPU 101 implements respective functional arrangements and processes (to be described later) by executing calculation and processing of information and control of respective hardware components based on control programs. A random access memory (RAM) 102 functions as the main memory of the CPU 101 and as a work memory necessary to load an execution program and execute a program. A read only memory (ROM) 103 records control programs that define the operation processing procedures of the CPU 101. The ROM 103 includes a program ROM that records an operating system (OS) serving as a system program of performing device control of the computer system, and a data ROM that records information and the like necessary to operate the system. Instead of the ROM 103, a hard disk drive (HDD) 107 to be described later is sometimes used.

A network interface (NETIF) 104 performs input/output control of data transmitted/received via a network. A display device 105 is, for example, a CRT display or a liquid crystal display. An input device 106 includes, for example, a touch panel, a keyboard, and a mouse for accepting an operation instruction from a user. The HDD 107 is a storage device. The HDD 107 is used to save data such as an application program. An I/O bus 108 includes busses (address bus, data bus, and control bus) for connecting the above-described units.

Figure 2:
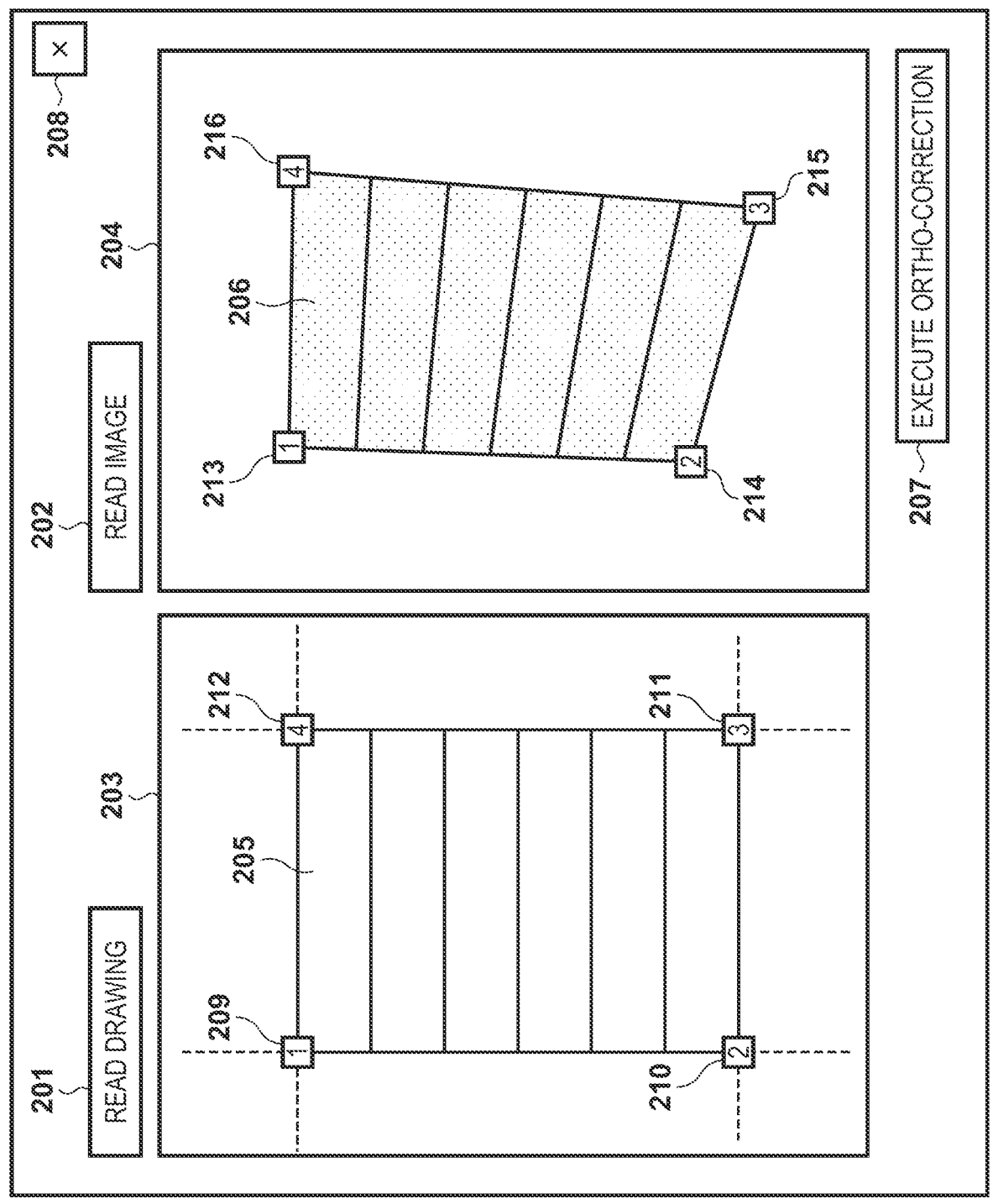
FIG. 2 is a view illustrating a screen displayed on a display device.

FIG. 2 is a view illustrating a screen displayed on the display device. This screen is a graphical user interface (GUI) that provides information to the user and accepts an input from the user.

The screen includes a drawing reading button 201, an image reading button 202, a drawing display area 203, a captured image display area 204, an ortho-correction designation button 207, and an application end button 208.

The drawing reading button 201 is used to designate reading of a drawing. The drawing is, for example, the design drawing (for example, front elevation view) of a structure that is rendered in accordance with a predetermined coordinate system. The drawing may be vector image data including dimensional information of a structure used in CAD software. The vector image data is image data of a form in which a figure such as a line, a circle, or a polygon expresses an image by vector information. As the drawing, raster image data is also available. The raster image data is image data of a form in which an image is expressed by an array of pixels representing color or density. The read drawing is displayed as an image 205 in the drawing display area 203.

The image reading button 202 is used to designate reading of a captured image. The captured image is, for example, an image obtained by capturing a structure corresponding to the above-mentioned drawing. The captured image is generally raster image data. The read captured image is displayed as an image 206 in the captured image display area 204.

Reference points 209 to 212 represented by squares (□) in the image 205 are reference points arranged on the drawing. Reference points 213 to 216 represented by squares in the image 206 are reference points arranged on the captured image. Among the reference points 209 to 212 and the reference points 213 to 216, paired reference points having the same numeral in the squares indicate the same position on a structure. Such a pair of reference points will be called a corresponding point pair. More specifically, FIG. 2 shows four corresponding point pairs, that is, the reference points 209 and 213, the reference points 210 and 214, the reference points 211 and 215, and the reference points 212 and 216. Although a numeral in a square represents reference points on the drawing and the captured image that indicate the same position on a structure, a corresponding point pair may be represented by assigning a color or a sign. When, for example, a pair is obvious to the user, the correspondence of the pair may not be clearly indicated on the GUI.

Figure 3:
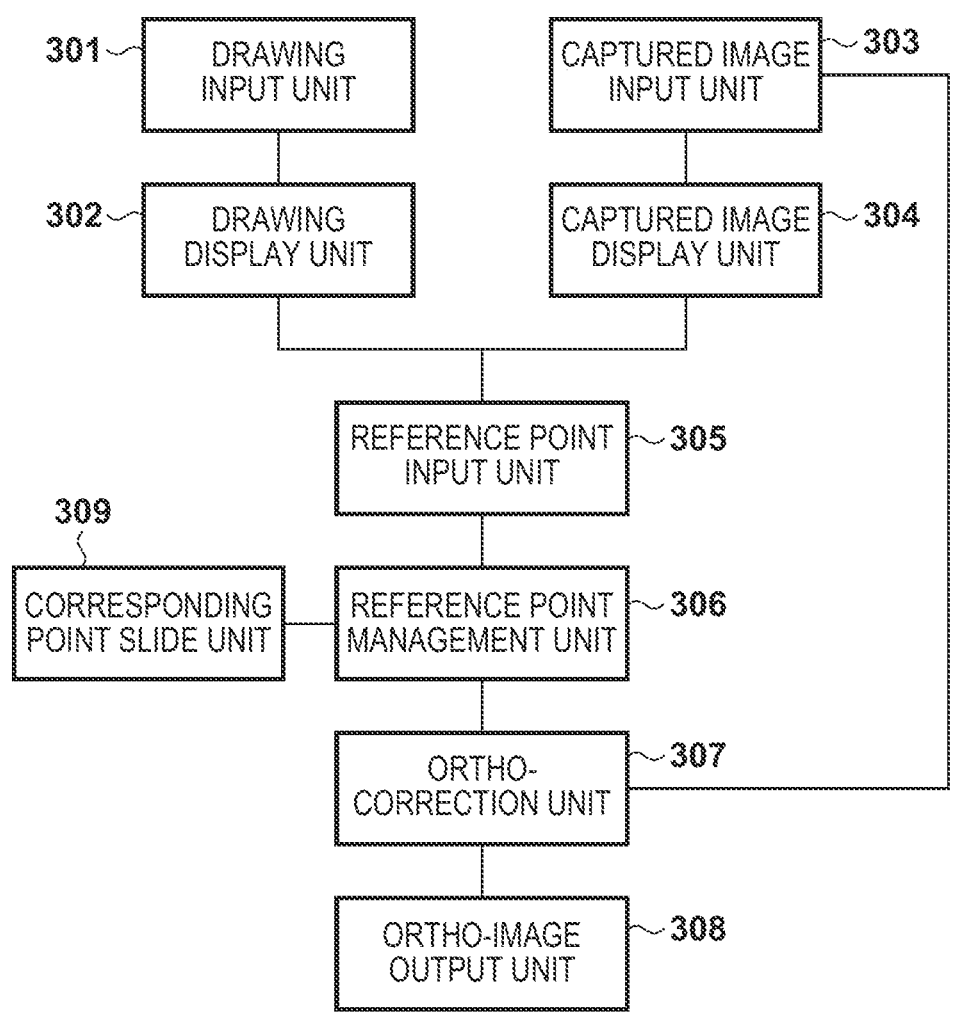
FIG. 3 is a block diagram showing the functional arrangement of the image processing apparatus according to the first embodiment.

FIG. 3 is a block diagram showing the functional arrangement of the image processing apparatus according to the first embodiment. A drawing input unit 301 accepts input of a drawing. A drawing display unit 302 displays, in the drawing display area 203, the drawing input by the drawing input unit 301. A captured image input unit 303 accepts input of a captured image. A captured image display unit 304 displays, in the captured image display area 204, the image input by the captured image input unit 303.

A reference point input unit 305 accepts coordinate input of reference points via the input device 106 for the drawing displayed in the drawing display area 203 and the captured image displayed in the captured image display area 204. A reference point management unit 306 holds the reference points input by the reference point input unit 305.

When a reference point is input on the drawing and the input reference point falls within a predetermined range centered at a feature point (easily positioned portion such as the intersection point of line segments) included in the drawing, the coordinates of the input reference point may be replaced with those of the feature point. When a pointer such as a mouse cursor displayed on the drawing enters the predetermined range centered at the feature point, the pointer may be moved to the feature point. The feature point is not limited to the intersection point of line segments, but may be the contour of an arbitrary figure included in the drawing, the intersection point of the contours of arbitrary figures, or the like. When the coordinates of a reference point or pointer are corrected, the correction of the coordinates may be explicitly represented by giving a visual, auditory, or tactile feedback to the user. When coordinates are corrected, for example, the color of the reference point or pointer is changed, the reference point or pointer is flickered, or the size of the reference point or pointer may be changed as the visual feedback. When coordinates are corrected, for example, a sound may be output as the auditory feedback. When coordinates are corrected, for example, the input device 106 may be vibrated as the tactile feedback.

An ortho-correction unit 307 executes ortho-correction processing on a captured image. Reference points on the drawing and the captured image that are designated by the reference point input unit 305 are received as input of correction parameters in ortho-correction processing. An ortho-image output unit 308 outputs an image as the result of ortho-correction processing by the ortho-correction unit 307. The output image is stored in the HDD 107. The output image may be displayed on the display device 105.

A corresponding point slide unit 309 accepts a user operation to a partial region surrounded by a plurality of corresponding point pairs and updates the partial region of interest (that is, the corresponding point pairs). More specifically, the moving direction and amount of corresponding point pairs are determined based on a user operation, and information of reference points forming the respective corresponding point pairs is updated. The user operation is, for example, an operation of substantially translating a reference point group arranged on the image 205 of the drawing by the directional key operation of the keyboard or the drag operation of the mouse.

Figure 4A:
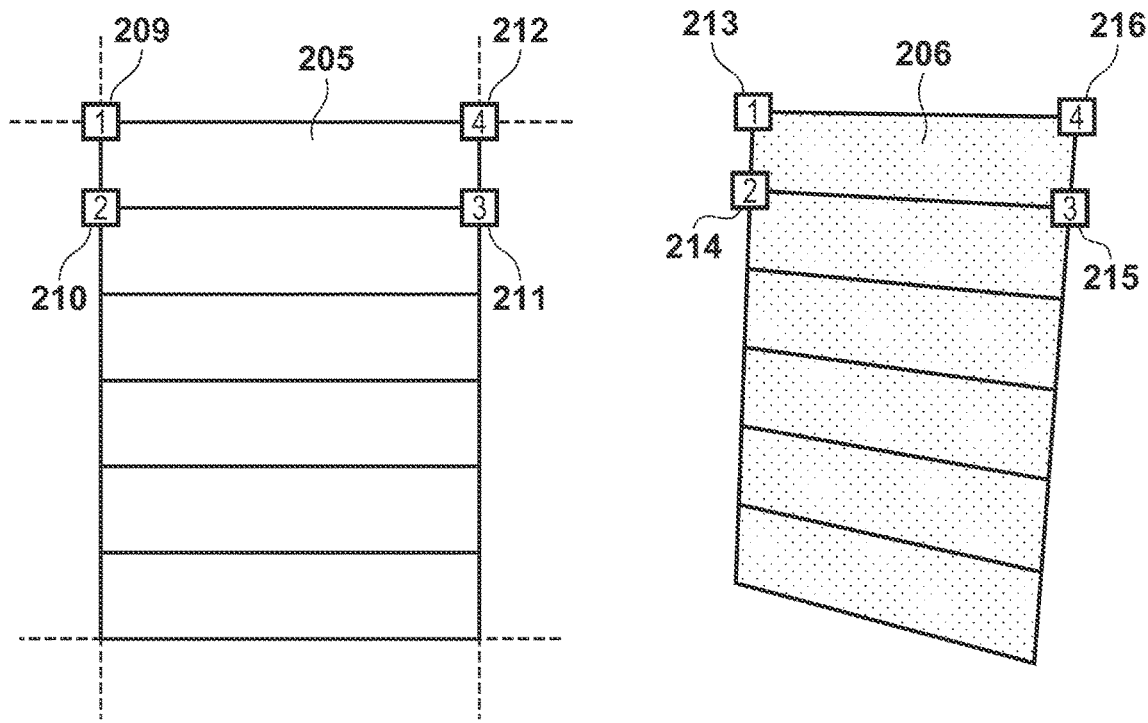
FIGS. 4A and 4B are views for explaining a corresponding point slide operation.
Figure 4B:
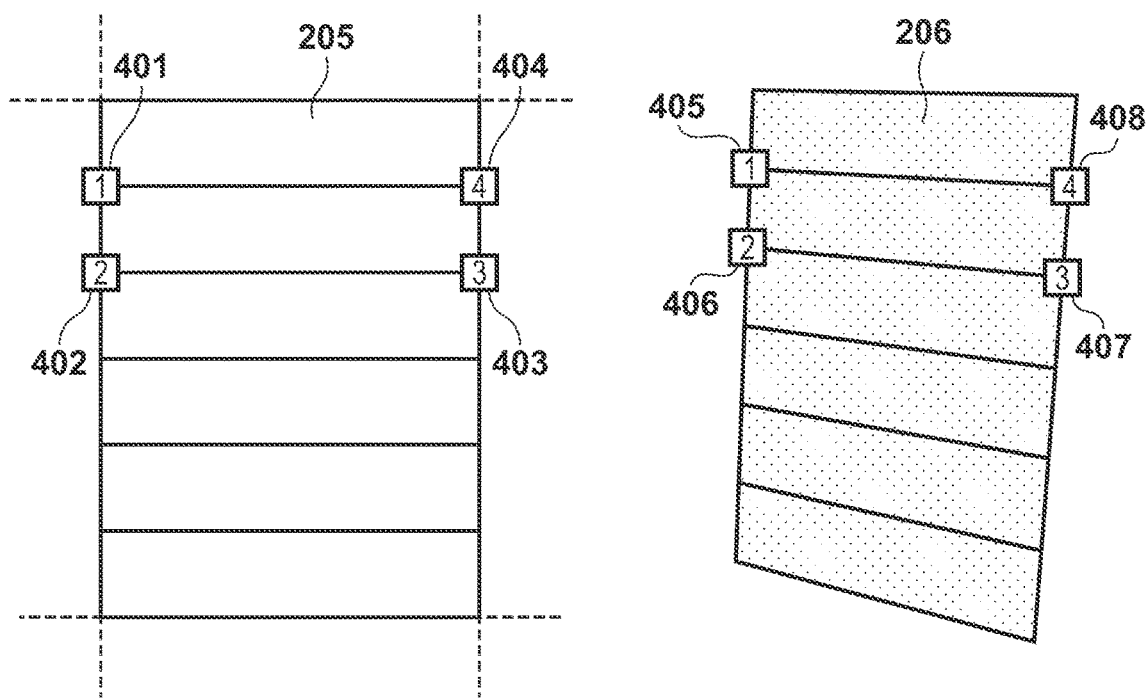

FIGS. 4A and 4B are views for explaining a corresponding point slide operation. FIGS. 4A and 4B exemplify a situation in which six rectangular regions surrounded by joints are aligned successively. FIG. 4A is an image view before the corresponding point slide operation and illustrates four corresponding point pairs. FIG. 4B is an image view after the corresponding point slide operation and illustrates four updated corresponding point pairs. Reference points 401 to 404 form a reference point group that defines a partial region in a drawing after the slide operation. Reference points 405 to 408 form a reference point group that defines a partial region in a captured image after the slide operation. The four corresponding point pairs in FIG. 4A are updated to the positions of the four corresponding point pairs in FIG. 4B by the corresponding point slide operation. In this embodiment, ortho-correction is executed sequentially on a partial region formed by four or more reference points. In this processing, a partial region used in the (k+1)th processing is designated based on a partial region formed by four or more reference points designated by the user in the kth processing, where k is an integer of 1 or higher.

FIGS. 5A to 5C are tables exemplifying a reference point table and a corresponding point table. FIG. 5A shows a drawing reference point table that stores the coordinates of a reference point in a drawing. FIG. 5B shows a captured image reference point table that stores the coordinates of a reference point in a captured image. FIGS. 5A and 5B show an example in which four reference points are stored for each of the drawing and captured image. That is, FIGS. 5A and 5B show an example in which a partial region of interest in each of the drawing and captured image is a quadrangle. FIG. 5C shows a corresponding point table that stores a corresponding point pair (a pair of a reference point in the drawing and a reference point in the captured image).

For example, a drawing reference point table before the slide operation stores the coordinates of the four reference points 209 to 212 shown in FIG. 4A as four reference points of IDs "1" to "4". A captured image reference point table before the slide operation stores the coordinates of the four reference points 213 to 216 shown in FIG. 4A as four reference points of IDs "1" to "4". A corresponding point table before the slide operation stores pairs each of reference points having the same numeral in squares in FIG. 4A, as corresponding point pairs of four points of IDs "1" to "4".

In FIGS. 5A to 5C, four IDs ("1" to "4") are assigned to corresponding point pairs of a partial region of interest. When the partial region of interest is to be changed, the coordinates of reference points of the four IDs are updated. When the partial region of interest is to be changed, different IDs may be added sequentially and stored in the table. For example, IDs "1" to "4" are assigned to the first partial region, and IDs "5" and "6" are assigned to the second partial region.

<Apparatus Operation>

Figure 6:
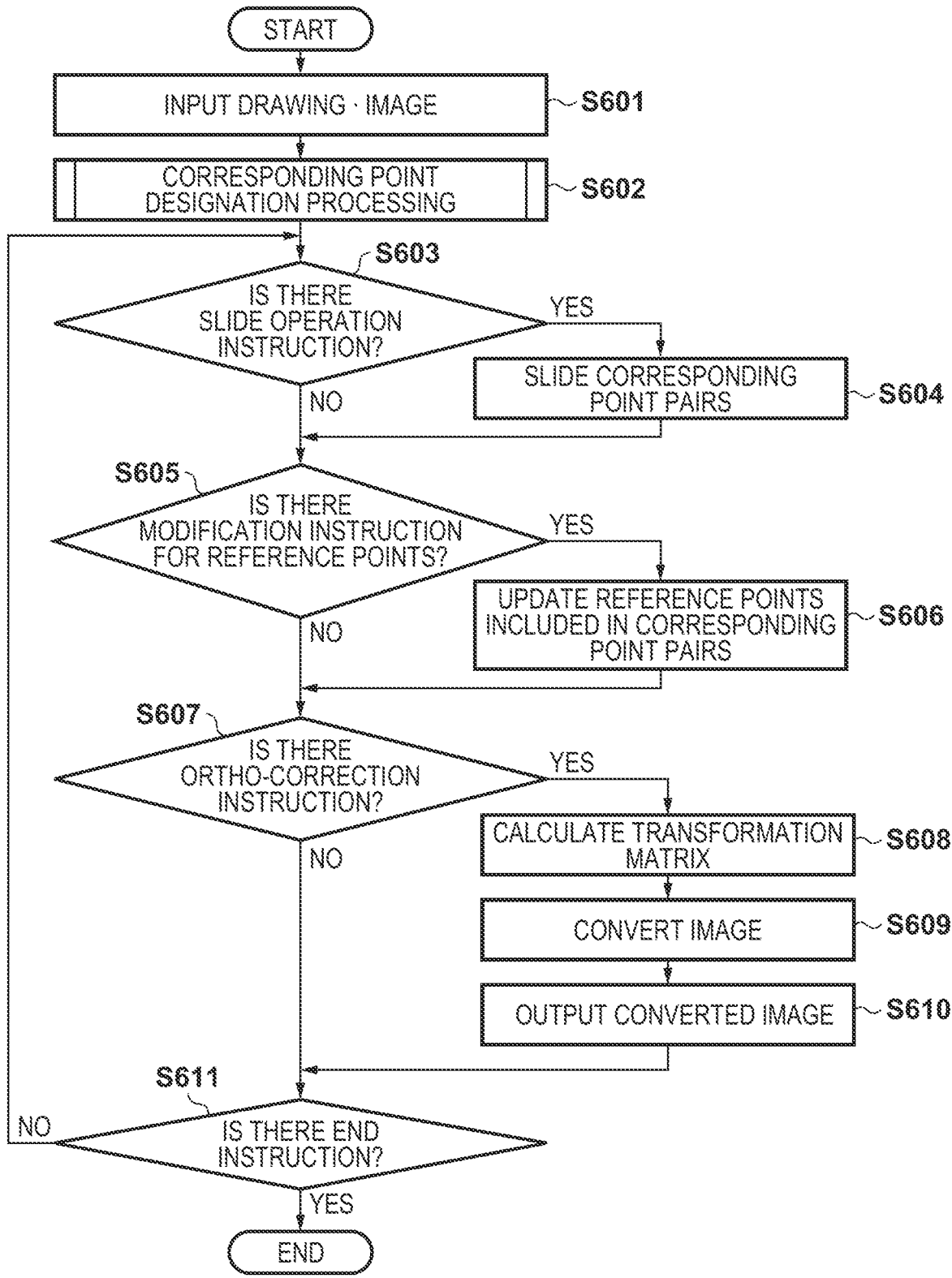
FIG. 6 is a flowchart of ortho-correction processing according to the first embodiment.

FIG. 6 is a flowchart of ortho-correction processing according to the first embodiment. This processing starts when, for example, the CPU 101 executes an application stored in the HDD 107.

In step S601, the drawing input unit 301 and the captured image input unit 303 accept input of a drawing and captured image, respectively. The drawing display unit 302 and the captured image display unit 304 display the drawing and the captured image, respectively.

In step S602, the reference point input unit 305 accepts input of corresponding point pairs for the drawing and captured image input in step S601. Details of step S602 will be described later with reference to FIGS. 7 and 8. In step S603, the corresponding point slide unit 309 determines whether the slide operation on the corresponding point pairs has been input. The slide operation intends to change a partial region of interest. If the slide operation has been input, the process advances to step S604. If no slide operation has been input, the process advances to step S605. In step S604, the corresponding point slide unit 309 slides the corresponding point pairs. That is, the reference point group in the drawing and the reference point group in the captured image are slid respectively.

A direction in which the corresponding point pairs are slid is acquired from the input device 106. For example, when a keyboard is used as the input device, an input arrow key direction is set as the direction in which the corresponding point pairs are slid. A moving amount by which the corresponding point pairs are slid is calculated as follows. First, bounding boxes (circumscribed rectangles) are calculated for the reference point group (reference points 209 to 211) in the drawing and the reference point group (reference points 213 to 216) in the captured image, respectively. If the direction of the slide is vertical, the "height" of the bounding box is set as a slide moving amount. If the direction of the slide is horizontal, the "width" of the bounding box is set as a slide moving amount. That is, a region adjacent to the partial region of interest now (in the kth processing) is set as a partial region of interest next (in the (k+1)th processing).

In step S605, the reference point input unit 305 determines whether a modification instruction has been accepted for the reference points included in the corresponding point pairs input in step S602 or slid in step S604. This is equivalent to a case in which the reference points in the drawing and the reference points in the captured image included in the corresponding point pairs after the slide are misaligned and the user manually modifies the misalignment. For example, the modification instruction for the reference points is accepted by dragging the reference points displayed on the drawing or the captured image. In step S605, the user can finely modify the individual reference points included in the corresponding point pairs slid in step S604. If the modification of the reference points included in the corresponding point pairs is designated, the process advances to step S606. If no modification is designated, the process advances to step S607. In step S606, if one or more reference points included in the corresponding point pairs are modified, the reference point management unit 306 updates the corresponding point table.

In step S607, the ortho-correction unit 307 determines whether an ortho-correction instruction has been input. If the ortho-correction instruction has been input, the process advances to step S608. If no ortho-correction instruction has been input, the process advances to step S611. In step S608, the ortho-correction unit 307 calculates a coordinate transformation matrix for obtaining an ortho-image from the captured image input in step S601. Here, the coordinate transformation matrix is assumed to be a homography matrix. The homography matrix is a matrix used in homography transformation in which a given plane is mapped to another plane. The homography matrix can be calculated using a known algorithm such as DLT (Direct Linear Transformation). Note that DLT requires four or more corresponding point pairs to calculate the homography matrix.

In step S609, the ortho-correction unit 307 executes conversion processing on the captured image input in step S601 by using the homography matrix obtained in step S608. In step S610, the ortho-image output unit 308 outputs the captured image converted in step S609. In step S611, the CPU 101 determines whether an application end instruction has been input. The application end instruction is input by pressing the application end button 208. If the end instruction has been input, the process ends. If no end instruction has been input, the process returns to step S603. The ortho-image generated by the above-described processing is used in, for example, processing of detecting a defect such as a crack generated in a surface of a structure.

In this embodiment, a reference point group and partial region used in the (k+1)th processing can be designated based on a designation operation by the user in the kth processing, and a modification from the user on the designation result can be accepted. Even when a captured image of a wide area is finely divided and ortho-correction is repeated, the user only performs an easy slide operation and if necessary, a modification after he/she performs at least once an operation of designating the coordinates of concrete reference points. This reduces the operation burden on the user.

Figure 7:
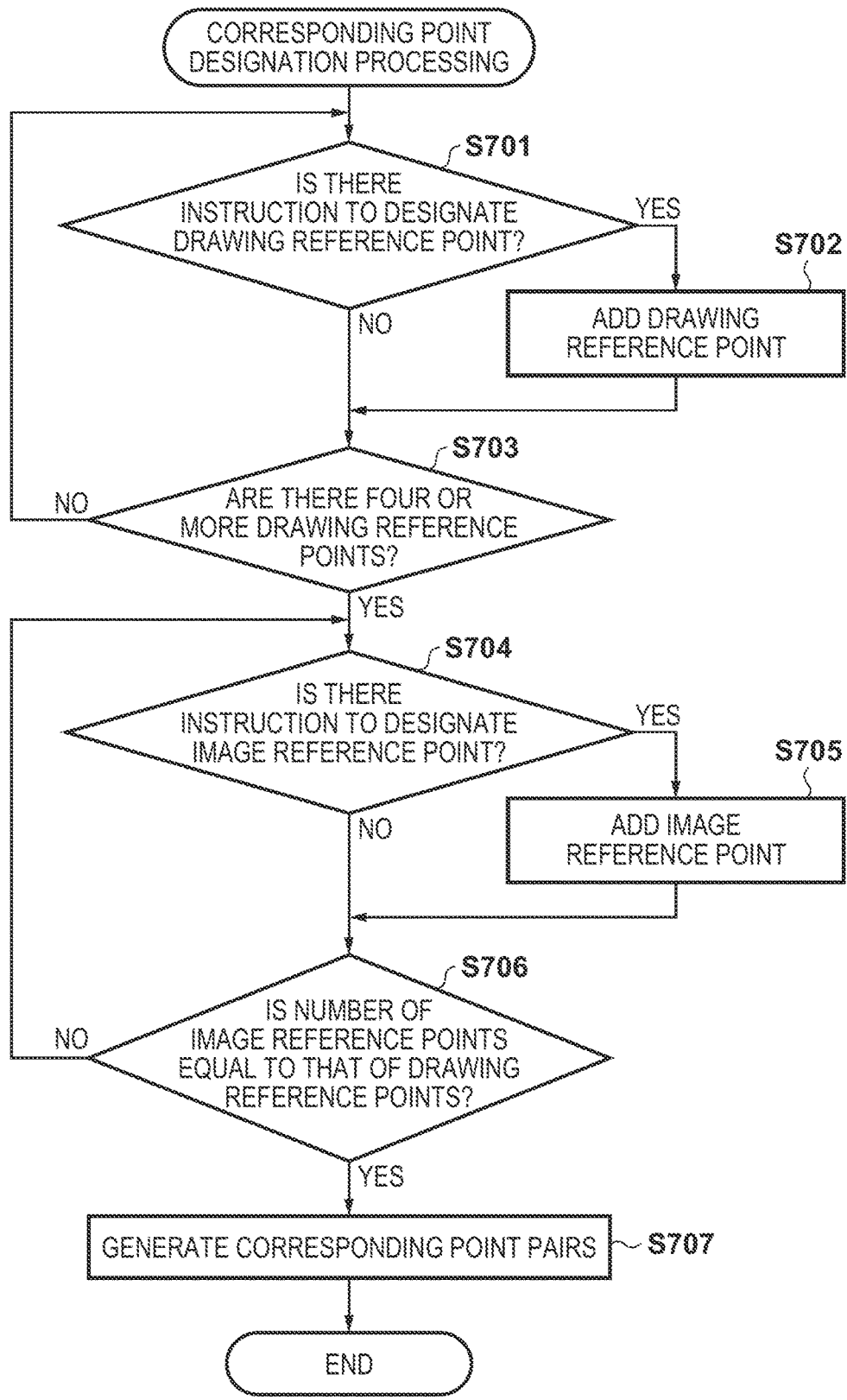
FIG. 7 is a flowchart of details of corresponding point designation processing (step S602)

FIG. 7 is a flowchart of details of the corresponding point designation processing (step S602). A method of inputting four corresponding point pairs by designating four or more reference points on a drawing and then designating corresponding reference points in the same number on a captured image will be explained with reference to FIG. 7.

In step S701, the reference point input unit 305 determines whether reference points have been designated on the drawing. If reference points have been designated, the process advances to step S702. If no reference points have been designated, the process advances to step S703. In step S702, the reference point input unit 305 adds the designated reference points to the drawing reference point table (FIG. 5A). In step S703, the reference point input unit 305 determines whether there are four or more reference points stored in the drawing reference point table. If there are four or more reference points, the process advances to step S704. If there are no four or more reference points, the process returns to step S701.

In step S704, the reference point input unit 305 determines whether reference points have been designated on the captured image. If reference points have been designated, the process advances to step S705. If no reference points have been designated, the process advances to step S706. In step S705, the reference point input unit 305 adds the designated reference points to the captured image reference point table (FIG. 5B). In step S706, the reference point input unit 305 determines whether the number of reference points stored in the captured image reference point table is equal to that of reference points stored in the drawing reference point table. If these numbers are equal, the process advances to step S707. If these numbers are different, the process returns to step S704.

In step S707, the reference point input unit 305 generates corresponding point pairs from the reference points stored in the drawing reference point table and the captured image reference point table. More specifically, reference points having the same ID are acquired from the two tables. The pair of acquired reference points is added as a corresponding point pair to the corresponding point table (FIG. 5C).

Although reference points in the drawing are designated first in FIG. 7, reference points in the captured image may be designated first.

Figure 8:
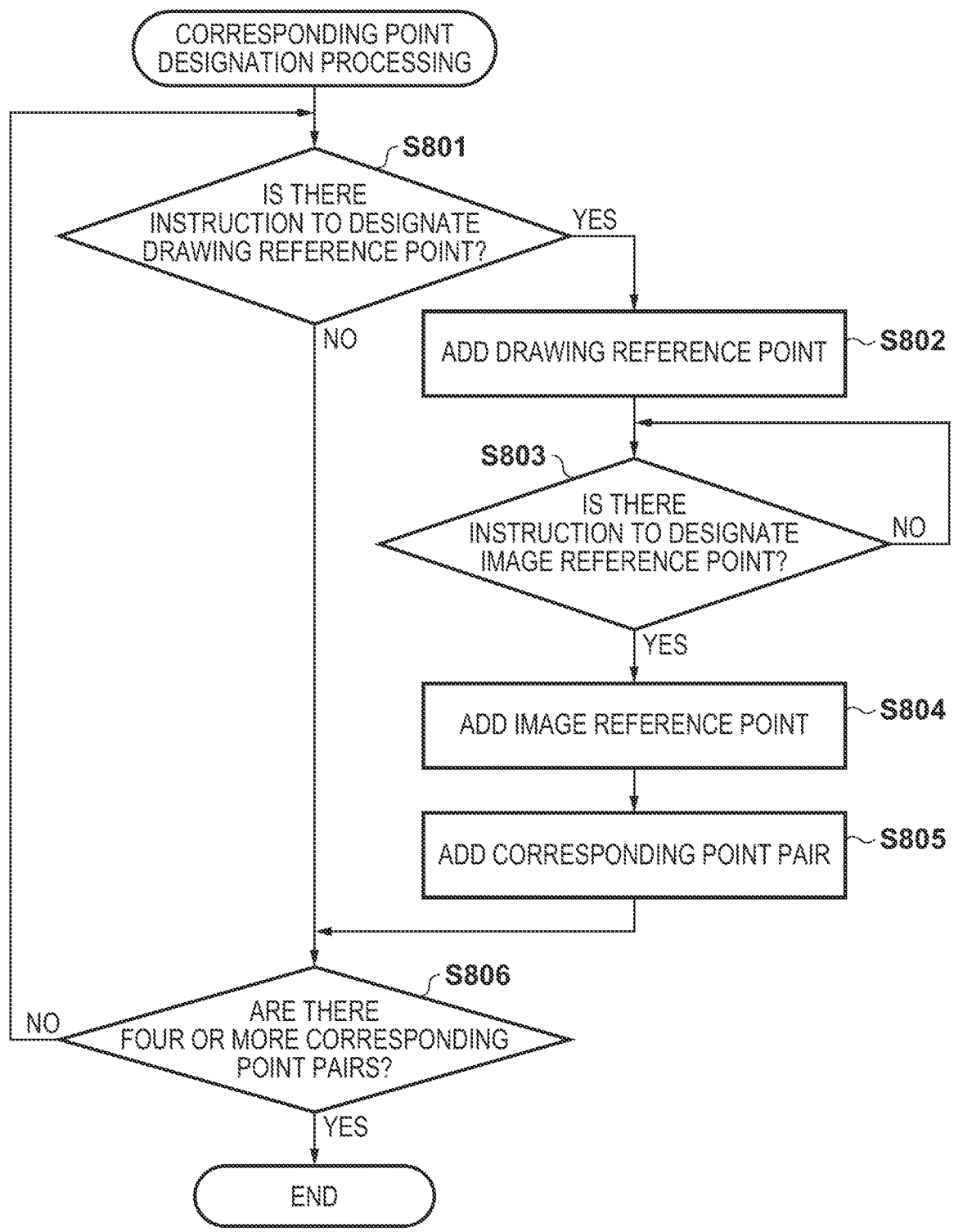
FIG. 8 is a flowchart of other details of corresponding point designation processing (step S602)

FIG. 8 is a flowchart of other details of the corresponding point designation processing (step S602). A method of inputting four corresponding point pairs by repeating four times or more an operation of designating a reference point on a drawing and then designating a corresponding reference point on a captured image will be explained with reference to FIG. 8.

In step S801, the reference point input unit 305 determines whether a reference point has been designated on the drawing. If a reference point has been designated, the process advances to step S802. If no reference point has been designated, the process advances to step S806. In step S802, the reference point input unit 305 adds the reference point designated in step S801 to the drawing reference point table (FIG. 5A). In step S803, the reference point input unit 305 determines whether a reference point has been designated on the captured image. If a reference point has been designated, the process advances to step S804. If no reference point has been designated, the process repeats step S803.

In step S804, the reference point input unit 305 adds the reference point designated in step S803 to the captured image reference point table (FIG. 5B).

In step S805, the reference point input unit 305 generates a corresponding point pair from the reference points stored in the drawing reference point table and the captured image reference point table. More specifically, reference points at the end of the two tables are acquired first. Then, the pair of acquired reference points is added as a corresponding point pair to the corresponding point table (FIG. 5C). The corresponding point pairing in step S707 of FIG. 7 and step S805 of FIG. 8 is performed based on an ordinal number (ID) assigned to each reference point, but is not limited to this. For example, at the stage at which reference points are designated in the same number on the drawing and the captured image, reference points at close relative positions among the reference point groups may be paired regardless of the ordinal number.

As described above, according to the first embodiment, a plurality of (for example, four) corresponding point pairs that define a partial region are sequentially designated through the loop of steps S603 to S611 by the operation described with reference to FIG. 6, and the ortho-image of the partial region is generated. An ortho-image corresponding to a desired region of a captured image can be obtained. According to the first embodiment, a plurality of corresponding point pairs corresponding to a new partial region can be easily set by the slide operation, and the labor of the user can be reduced. Particularly when a plurality of rectangular regions surrounded by joints are aligned successively, as shown in FIGS. 4A and 4B, the labor of the user regarding the setting of a new partial region can be reduced greatly.

The output processing of the converted image in step S610 will be further explained below. In this embodiment, data of the converted captured image is held in a storage area such as the RAM 102, displayed on the display device, and presented to the user in step S610.

Figure 14A:
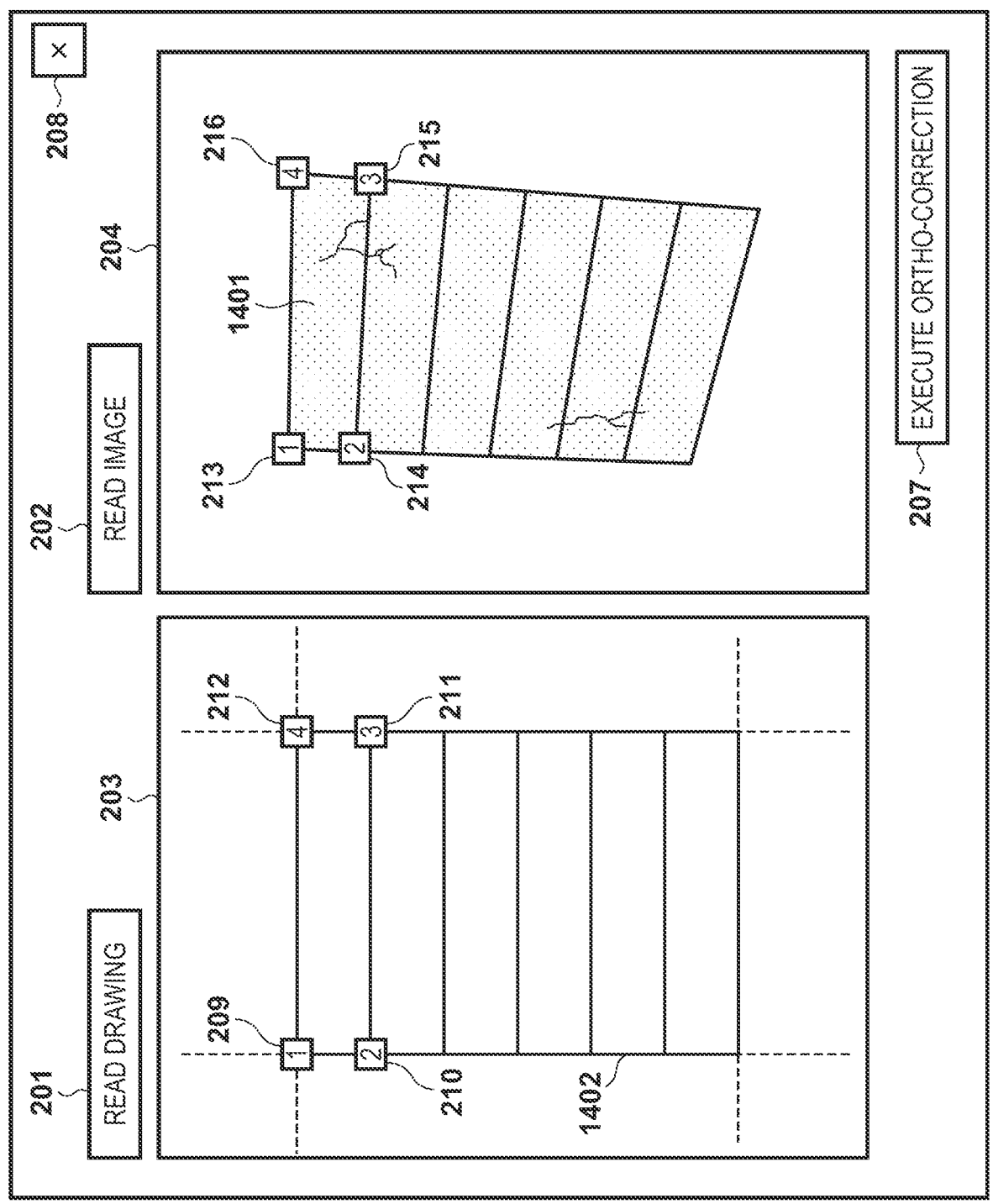
FIGS. 14A to 14C are views each exemplifying a screen displayed on the display device.
Figure 14B:
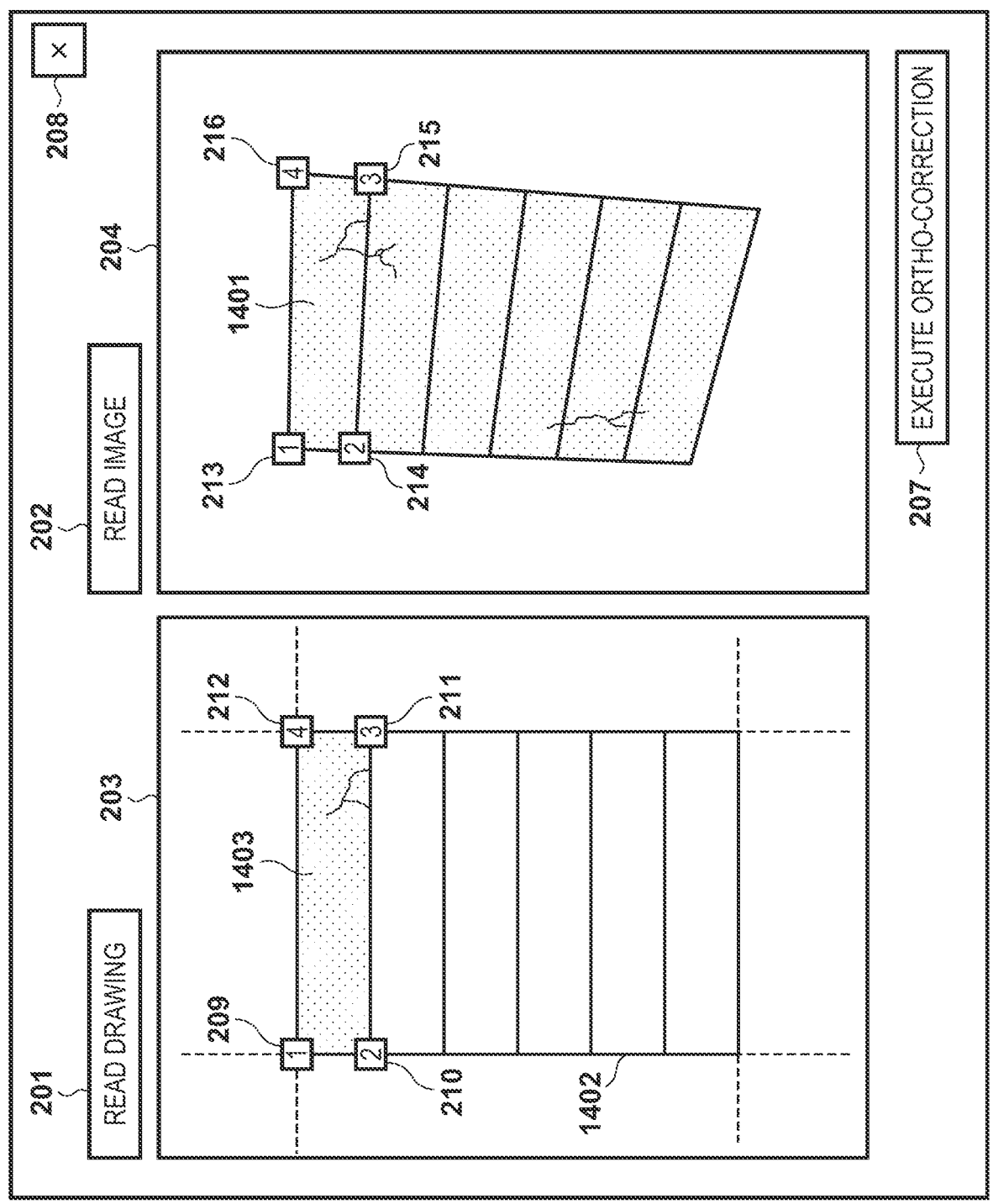
Figure 14C:
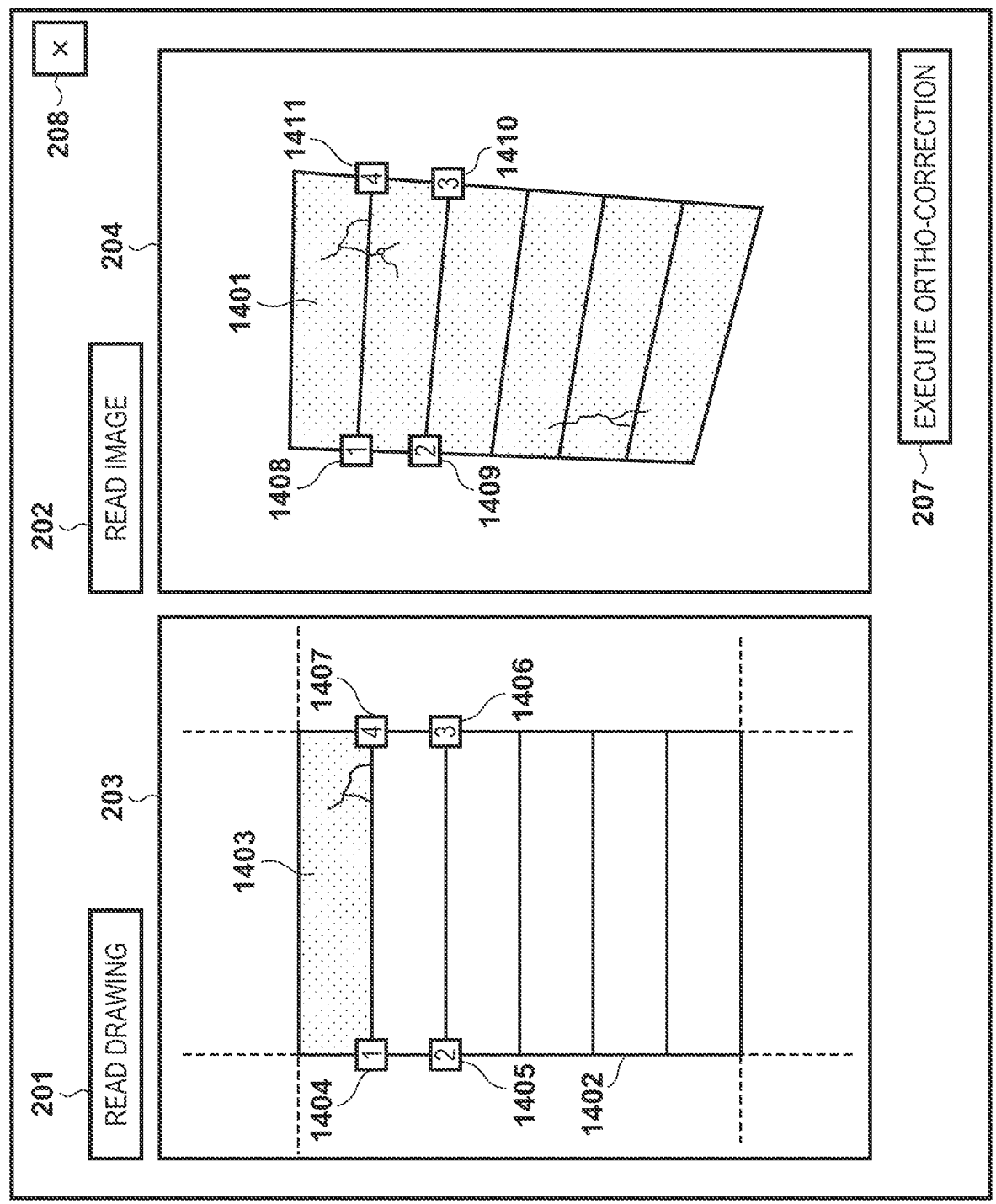

FIGS. 14A to 14C show one aspect of the graphical user interface shown in FIG. 2. The same reference numerals as those in FIG. 2 denote components similar to those already described with reference to FIG. 2, and a detailed description thereof will not be repeated.

In FIG. 14A, an image 1401 is displayed in the captured image display area 204. The image 1401 is part of a captured image of a concrete wall surface to be inspected, and represents a state in which rectangular regions surrounded by joints are aligned successively. In this embodiment, an image is used for inspection of a concrete wall surface, so an image having undergone image processing such as ortho-correction needs to maintain a predetermined high or higher resolution. To capture a wide range of a concrete wall surface at high resolution, the concrete wall surface is divided a plurality of times, the respective divided regions are captured at high resolution, and a composite image is generated by stitch processing. That is, the image 1401 may be an image obtained by stitching images of the concrete wall surface that are captured by divisional capturing using an electric pan head and an image capturing apparatus.

Drawing data corresponding to the image 1401 is displayed as an image 1402 in the drawing display area 203. FIG. 14A is an image view before a correction instruction. The reference points 209 to 216 that form four corresponding point pairs are designated by the first operation (step S602). If the user designates ortho-correction (YES in step S607), the image is converted (steps S608 and S609). The converted image is then output (step S610).

FIG. 14B shows an example of the graphical user interface that newly displays the converted image. In FIG. 14B, the slide operation on corresponding point pairs has not been designated yet. The result of ortho-converting an image of a portion defined by the reference points 213 to 216 in the captured image display area 204 is superimposed and displayed on a rectangular region surrounded by the reference points 209 to 212 in the drawing display area 203. The user can check the conversion result from the display of the converted image. After the check of the result, the user designates the slide operation on corresponding points for the next processing.

FIG. 14C is a view after the slide operation on corresponding points and shows four updated corresponding point pairs. Reference points 1404 to 1407 form a reference point group that defines a partial region in the drawing after the slide operation. Reference points 1408 to 1411 form a reference point group that defines a partial region in the captured image after the slide operation. In this embodiment, the position and width of a defect (for example, a crack) widely generated in a structure can be automatically estimated using a converted image input as a target image of defect detection processing by a detector. As the detector, a model learned by machine learning is used. The learned model is generated by using captured images of the structure as input data and, as output data, pixels confirmed as a defect (for example, a crack) by a person, performing machine learning of pairs of these data as learning data, and gaining knowledge. At this time, data obtained by modifying the detection result by an observer may be relearned as training data. The learned model can be constructed by, for example, a neural network model.

In this embodiment, a crack is detected by a neural network. The input of the neural network is 25 pixels×25 pixels×RGB. The output is one and is a value (value of 0 (inclusive) to 1 (inclusive)) representing the likelihood of a crack in a central pixel among 25 pixels×25 pixels. The neural network is a known technique, so a detailed description thereof will be omitted. Note that the defect detection processing is executed by the same image processing apparatus as that for the above-described ortho-correction processing, or an information processing apparatus that constitutes a defect detection system together with the image processing apparatus.

In the first embodiment, images output after coordinate transformation for respective partial images designated by corresponding point pairs can be combined based on the layout in the drawing display area 203 and feature points extracted from the respective images.

Second Embodiment

In the second embodiment, a form will be described in which auxiliary lines are generated from feature lines such as joints taken in a captured image and a plurality of corresponding point pairs corresponding to a new partial region are set using the auxiliary lines.

Figure 9:
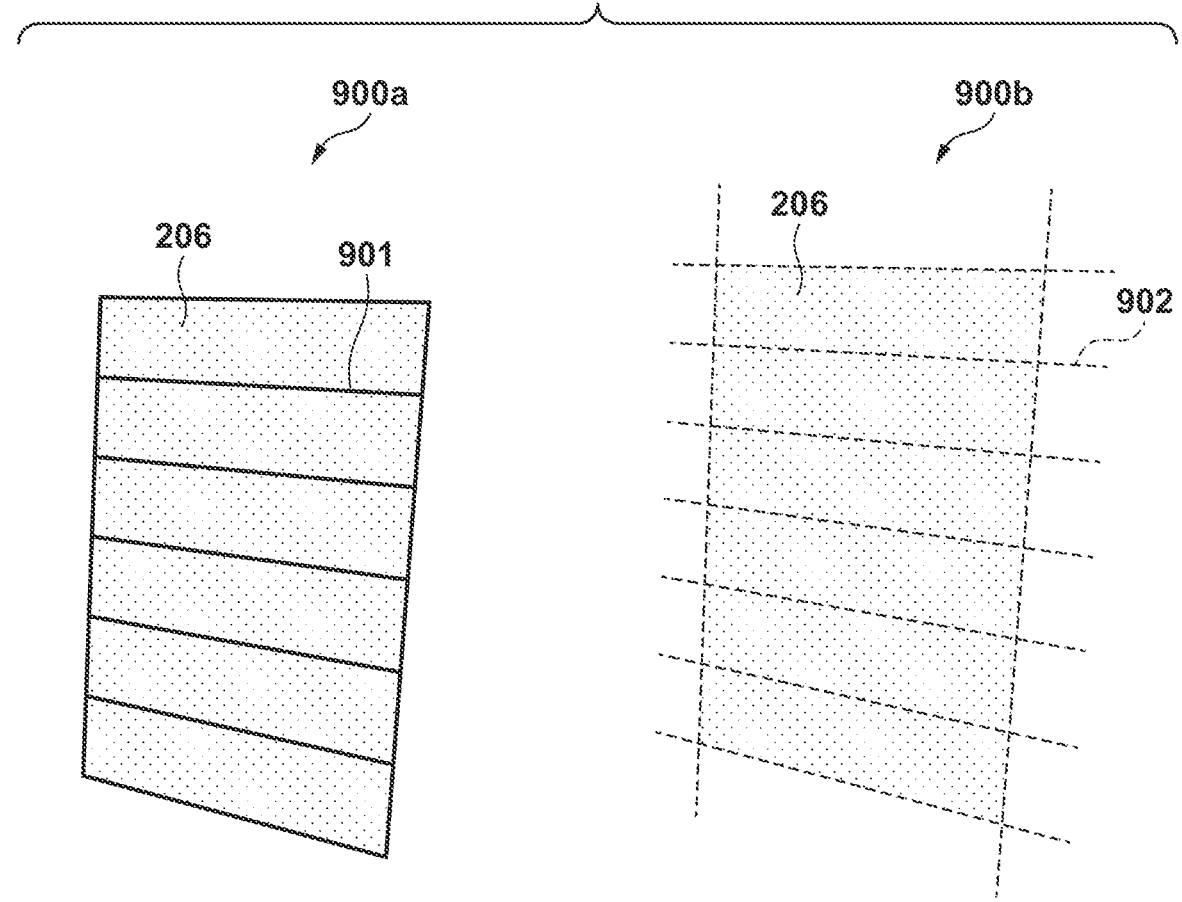
FIG. 9 is a view for explaining generation of auxiliary lines.

FIG. 9 is a view for explaining generation of auxiliary lines. An image 900a exemplifies a captured image before generation of auxiliary lines. Feature lines 901 of joints (gaps or seams between members of a structure) are taken in an image 206 corresponding to the captured image. An image 900b represents a captured image in which the generated auxiliary lines are superimposed. Auxiliary lines 902 are generated based on the feature lines 901.

<Apparatus Arrangement>

Figure 10:
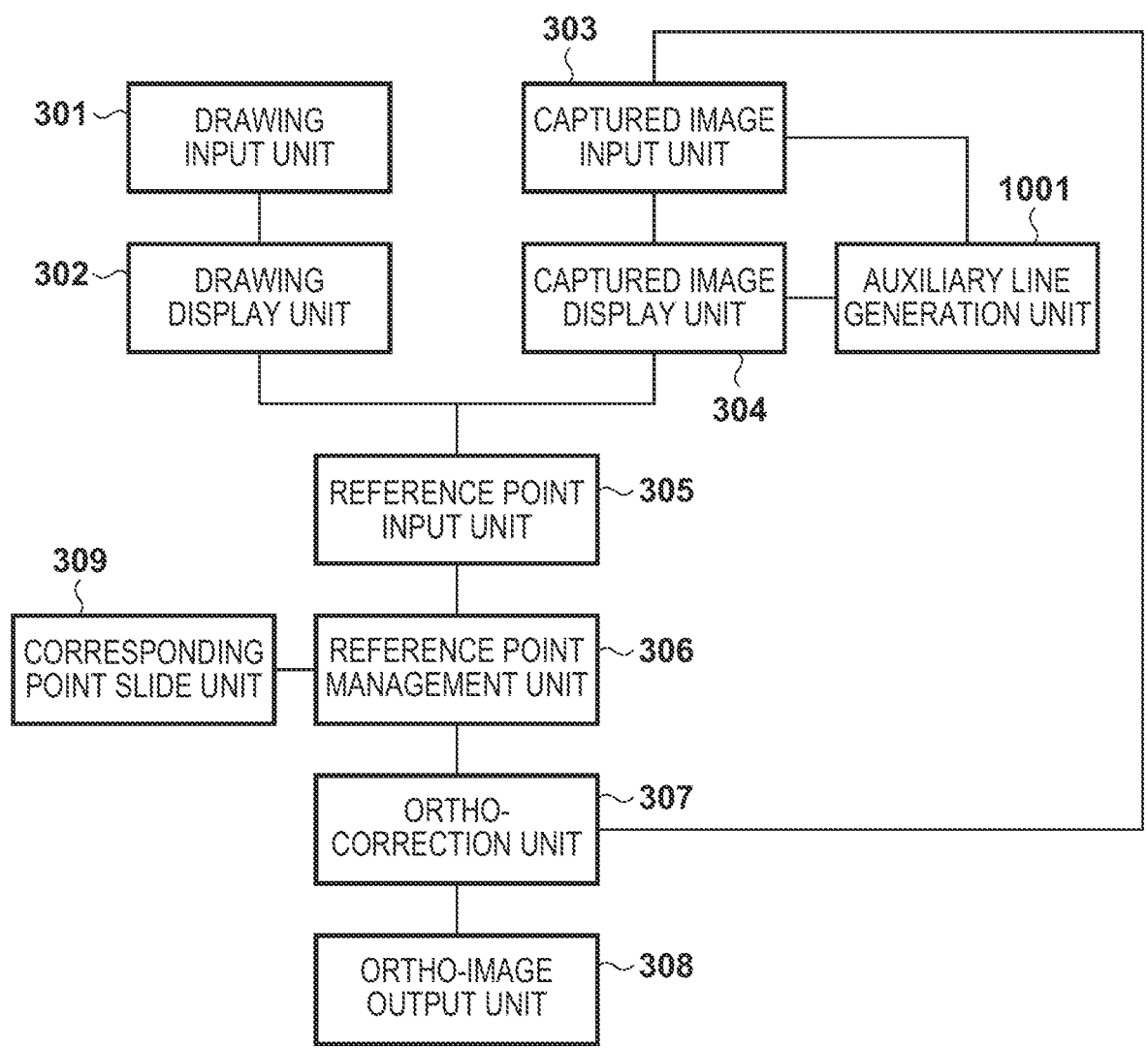
FIG. 10 is a block diagram showing the functional arrangement of an image processing apparatus according to the second embodiment.

FIG. 10 is a block diagram showing the functional arrangement of an image processing apparatus according to the second embodiment. An auxiliary line generation unit 1001 generates auxiliary lines by image recognition or the like from feature lines such as joints taken in a captured image. Note that manual input of auxiliary lines may be accepted from a user. The generated auxiliary lines are used for correction of reference points included in corresponding point pairs after the slide operation, as described above.

<Apparatus Operation>

Figure 11:
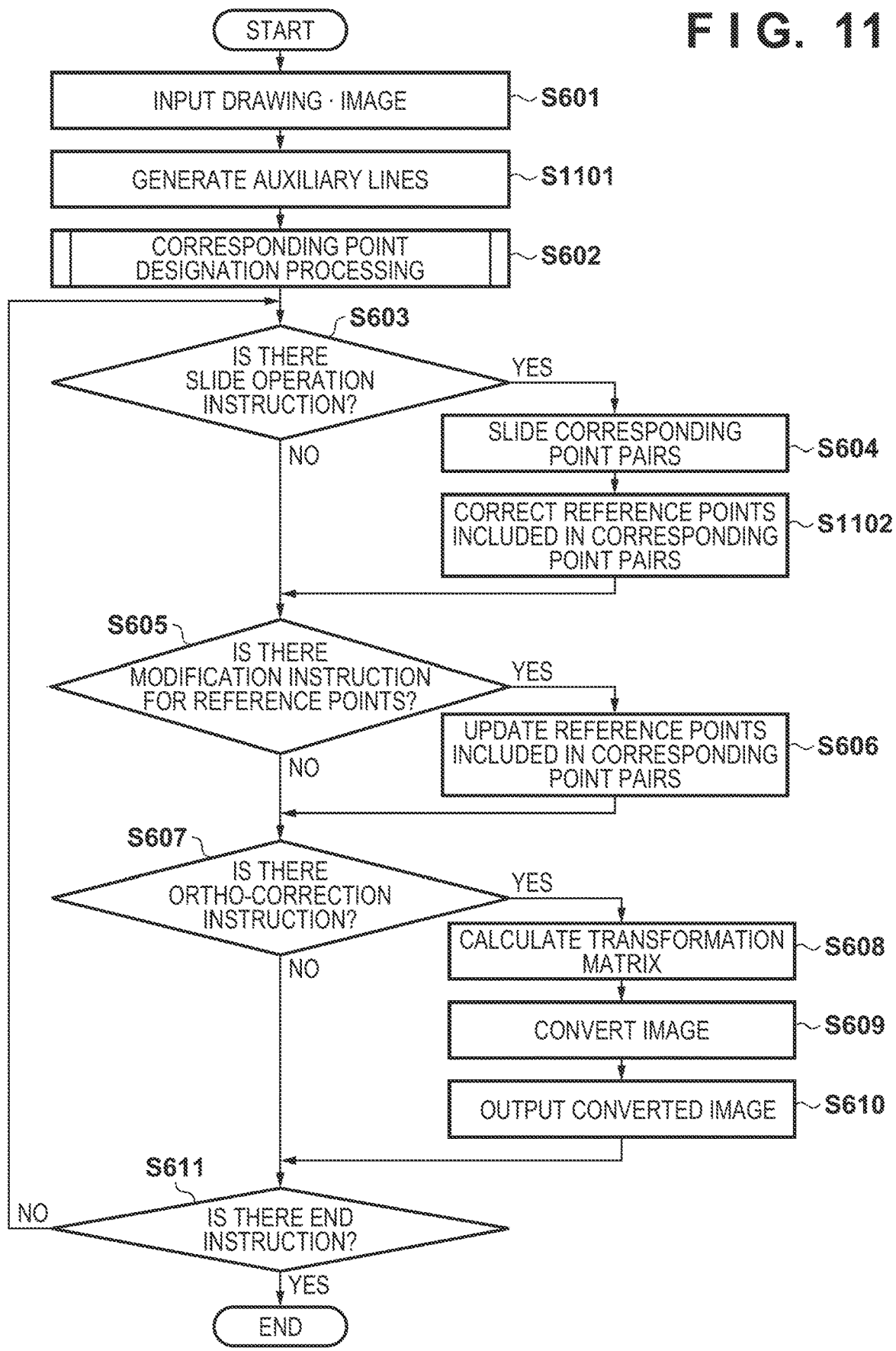
FIG. 11 is a flowchart of ortho-correction processing according to the second embodiment.

FIG. 11 is a flowchart of ortho-correction processing according to the second embodiment. Steps S601 to S611 are similar to those in FIG. 6, and a repetitive description will be omitted.

In step S1101, the auxiliary line generation unit 1001 extracts feature lines such as joints taken in a captured image and generates auxiliary lines. The extraction of feature lines such as joints can use Canny used for edge detection or Hough transform used for extraction of a feature such as a straight line. In step S1102, a reference point input unit 305 modifies, based on the auxiliary lines or the intersection points of the auxiliary lines, reference points included in new corresponding point pairs provisionally designated by the slide operation. For example, when a reference point included in a corresponding point pair falls within a predetermined range centered at the intersection point of auxiliary lines, the coordinates of the reference point are replaced with those of the intersection point. When a reference point included in a corresponding point pair falls within a predetermined range from an auxiliary line, the coordinates of the reference point may be modified by the intersection point of the auxiliary line and a perpendicular drawn from the reference point to the auxiliary line.

As described above, according to the second embodiment, when setting reference points used in the (k+1)th processing based on a designation operation by the user in the kth processing, auxiliary lines are generated based on feature lines such as joints taken in a captured image and are used. This can reduce the labor of the user when modifying the misalignment between reference points in a drawing and reference points in a captured image that are included in corresponding point pairs.

Third Embodiment

In the third embodiment, a form will be described in which a plurality of corresponding point pairs in a new partial region are calculated using a transformation matrix used in ortho-correction processing on a previously processed partial region.

<Apparatus Arrangement>

Figure 12:
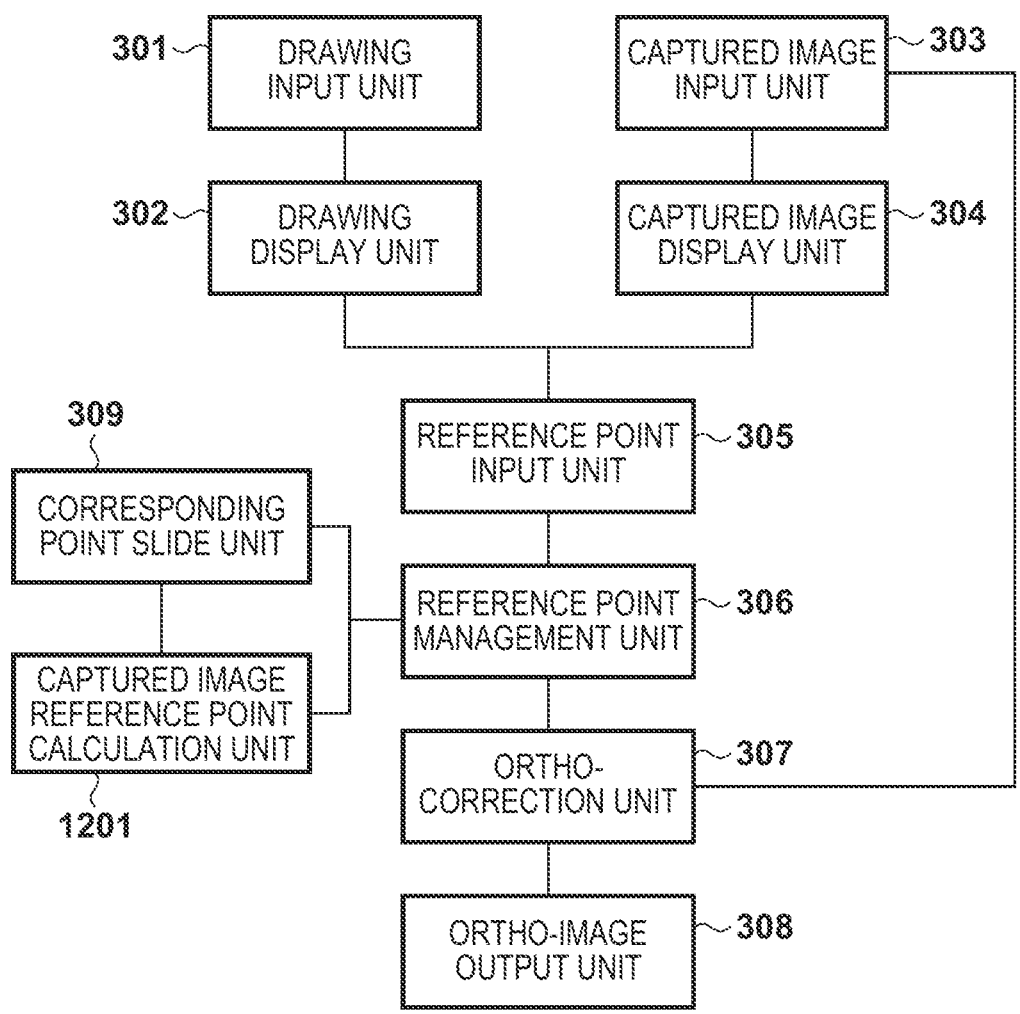
FIG. 12 is a block diagram showing the functional arrangement of an image processing apparatus according to the third embodiment.

FIG. 12 is a block diagram showing the functional arrangement of an image processing apparatus according to the third embodiment. A captured image reference point calculation unit 1201 calculates a reference point group in a captured image corresponding to a new partial region based on a reference point group in a drawing corresponding to the new partial region. More specifically, the reference point group in the captured image is calculated from the reference point group in the drawing by using a transformation matrix used in ortho-correction processing on a previously processed partial region.

<Apparatus Operation>

Figure 13:
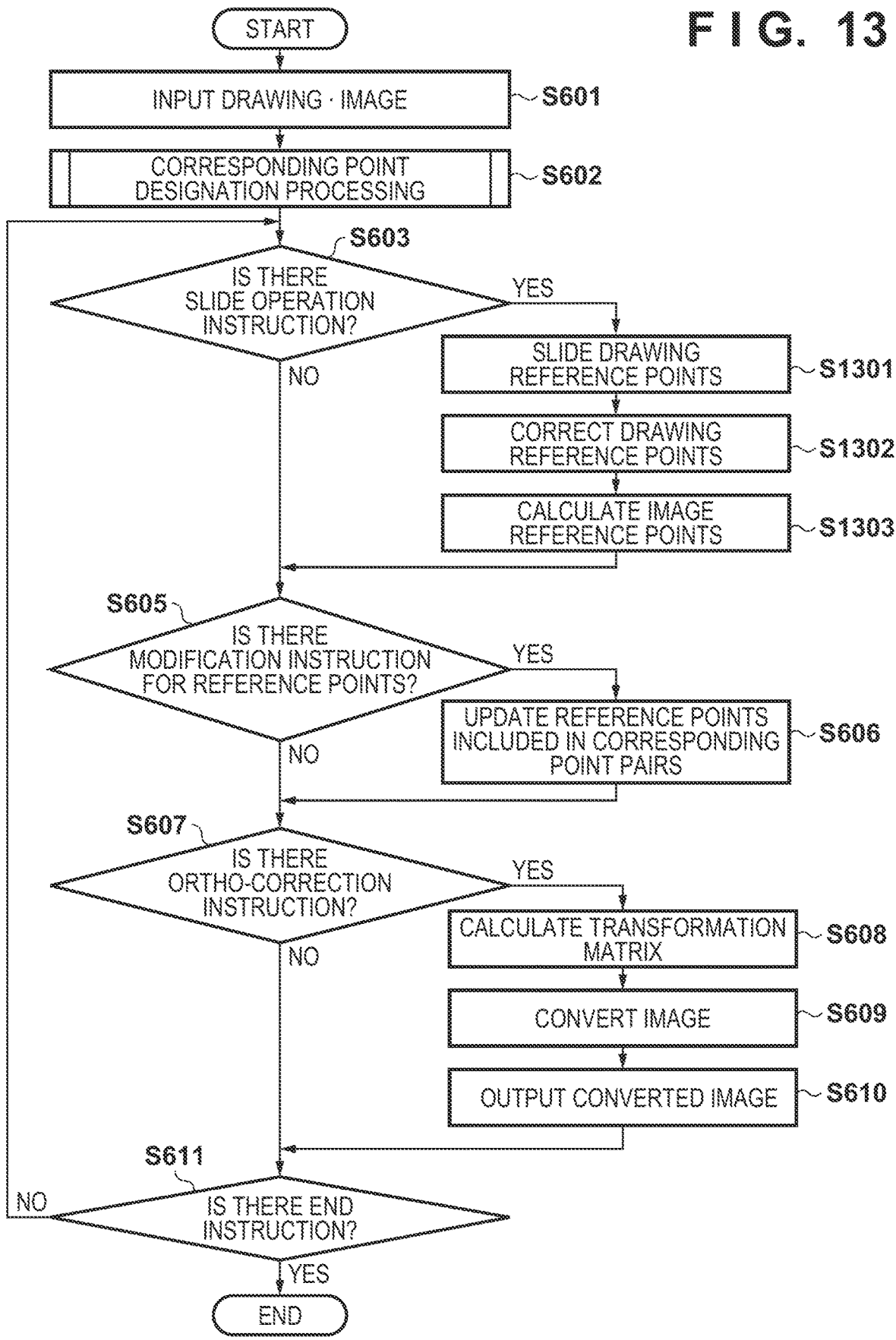
FIG. 13 is a flowchart of ortho-correction processing according to the third embodiment.

FIG. 13 is a flowchart of ortho-correction processing according to the third embodiment. Steps S601 to S611 are similar to those in FIG. 6, and a repetitive description will be omitted.

In step S1301, a corresponding point slide unit 309 slides only a group of reference points in a drawing. The direction and amount of the slide can be the same as those in the first embodiment (step S604). In step S1302, the corresponding point slide unit 309 corrects, based on the intersection points of line segments included in the drawing, the reference point group in the drawing calculated in step S1301. Note that the correction of reference points can be performed not only on the intersection points of line segments but also on the contour of an arbitrary figure included in a drawing or the intersection points of the contours of arbitrary figures.

In step S1303, the captured image reference point calculation unit 1201 applies a transformation matrix calculated in step S608 for a previous partial region (previous loop of steps S603 to S611) to the reference point group in the drawing obtained in steps S1301 and S1302. As a result, a reference point group in a captured image is obtained. For example, let $H_{(k)}$ be a transformation matrix calculated in step S608 for a partial region in previous processing (kth loop). Also, let $p_{dn(k+1)}$ be a reference point group in the drawing of a partial region in current processing ((k+1)th loop). In this case, a reference point group $p_{in(k+1)}$ to be newly set in a captured image in the current processing ((k+1)th loop) is given by:

$$p_{in(k+1)} = H_{(k)}^{-1} p_{dn(k+1)} \qquad (1)$$

where n is the ID (n=1, 2, 3, 4), and $H_{(k)}^{-1}$ is the inverse matrix of $H_{(k)}$.

Note that the reference point group in the captured image obtained by equation (1) may be further corrected using auxiliary lines described in the second embodiment.

As described above, according to the third embodiment, a plurality of corresponding point pairs in a new partial region are calculated using a transformation matrix used in ortho-correction processing on a previously processed partial region. The coordinates of the reference point group in the captured image corresponding to the new partial region can be derived more accurately, and the labor of the user in modification of misalignment can be reduced.

Other Embodiments

Embodiment(s) of the present invention can also be realized by a computer of a system or apparatus that reads out and executes computer executable instructions (e.g., one or more programs) recorded on a storage medium (which may also be referred to more hilly as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-003610, filed Jan. 11, 2019 and Japanese Patent Application No. 2019-193639, filed Oct. 24, 2019 which are hereby incorporated by reference herein in their entirety.

What is claimed is:

1. An image processing apparatus comprising:
one or more processors configured to execute a plurality of tasks, including:
    a first designation task that designates a first partial region for a first image in which a configuration of a structure is rendered in accordance with a predetermined coordinate system;
    a second designation task that designates a second partial region corresponding to the first partial region for a second image including an image obtained by capturing a surface of the structure; and
    a conversion task that converts an image of the second partial region into an image complying with the predetermined coordinate system based on a coordinate of the first partial region in the first image and a coordinate of the second partial region in the second image,
    wherein the first designation task sequentially designates different first partial regions in the first image,
    wherein the first designation task designates a first partial region at a (k+1)th time based on a first partial region designated at a kth time, wherein k is integer greater than 0, and
    wherein the image converted by the conversion task is used for detection processing of a defect generated on the surface of the structure.

2. The apparatus according to claim 1, wherein:
the plurality of tasks include a derivation task that derives a coordinate transformation matrix based on the coordinate of the first partial region in the first image and the coordinate of the second partial region in the second image, and
the conversion task converts the image of the second partial region into an image complying with the predetermined coordinate system based on the coordinate transformation matrix derived by the derivation task.

3. The apparatus according to claim 2, wherein the second designation task designates a second partial region at the (k+1)th time based on a coordinate derived from an inverse matrix of a coordinate transformation matrix derived by the derivation task at the kth time and a coordinate of the first partial region at the (k+1)th time.

4. The apparatus according to claim 1, wherein the first designation task designates, as the first partial region at the (k+1)th time, a region that is obtained by translating the first partial region designated at the kth time and is adjacent to the first partial region designated at the kth time.

5. The apparatus according to claim 1, wherein the second designation task designates a second partial region at the (k+1)th time based on a second partial region designated at the kth time.

6. The apparatus according to claim 5, wherein the second designation task designates, as the second partial region at the (k+1)th time, a region that is obtained by substantially translating the second partial region designated at the kth time and is adjacent to the second partial region designated at the kth time.

7. The apparatus according to claim 1, wherein the plurality of tasks include a display control task that controls a display device to display the converted image of the second partial region over the first partial region.

8. The apparatus according to claim 7, wherein the display control task controls the display device to display the first image and the second image side by side.

9. The apparatus according to claim 1, wherein:
the plurality of tasks include a detection task that detects a feature line of the structure in the second image, and
the second designation task provisionally designates a second partial region at the (k+1)th time based on a coordinate of a second partial region designated at the kth time, and modifies the provisionally designated second partial region based on a feature line detected by the detection task.

10. The apparatus according to claim 9, wherein the plurality of task include a providing task that provides one of a visual feedback, an auditory feedback, or a tactile feedback to a user when the second designation task performs the modification.

11. The apparatus according to claim 1, the plurality of tasks include an acceptance task that accepts a modification from a user on at least one of the first partial region and second partial region.

12. The apparatus according to claim 1, wherein the first image is a design drawing of the structure.

13. The apparatus according to claim 1, wherein the second image is obtained by combining a plurality of images obtained by respectively capturing different regions of the surface of the structure.

14. The apparatus according to claim 1, wherein the first partial region and the second partial region are designated respectively by a plurality of reference points and a plurality of reference points that are equal in number.

15. The apparatus according to claim 14, wherein the conversion task calculates, based on coordinates of the plurality of reference points, a homography matrix for performing projective transformation of an image coordinate system of the second image into the predetermined coordinate system, and converts the image of the second partial region into an image complying with the predetermined coordinate system using the calculated homography matrix.

16. The apparatus according to claim 15, wherein the first designation task designates the first partial region at the (k+1)th time using an inverse matrix of the homography matrix calculated in regard to the first partial region at the kth time.

17. A method of controlling an image processing apparatus that generates an image complying with a predetermined coordinate system, the method comprising:
- designating a first partial region for a first image in which a configuration of a structure is rendered in accordance with the predetermined coordinate system;
- designating a second partial region corresponding to the first partial region for a second image including an image obtained by capturing a surface of the structure; and
- converting an image of the second partial region into an image complying with the predetermined coordinate system based on a coordinate of the first partial region in the first image and a coordinate of the second partial region in the second image,
- wherein the designating of the first partial region sequentially designates different first partial regions in the first image,
- wherein the designating of the first partial region designates a first partial region at a (k+1)th time based on a first partial region designated at a kth time, wherein k is integer greater than 0, and
- wherein the converted image is used for detection processing of a defect generated on the surface of the structure.

18. A non-transitory computer-readable recording medium storing a program executable by a computer to a method of controlling an image processing apparatus that generates an image complying with a predetermined coordinate system, the method comprising:
- designating a first partial region for a first image in which a configuration of a structure is rendered in accordance with a predetermined coordinate system;
- designating a second partial region corresponding to the first partial region for a second image including an image obtained by capturing a surface of the structure; and
- converting an image of the second partial region into an image complying with the predetermined coordinate system based on a coordinate of the first partial region in the first image and a coordinate of the second partial region in the second image,
- wherein the designating of the first partial region sequentially designates different first partial regions in the first image,
- wherein the designating of the first partial region designates a first partial region at a (k+1)th time based on a first partial region designated at a kth time, wherein k is integer greater than 0, and
- wherein the converted image is used for detection processing of a defect generated on the surface of the structure.

19. An information processing system that detects a defect generated on a wall surface of a structure, the system comprising:
- one or more processors configured to execute a plurality of tasks, including:
  - a first designation task that designates a first partial region for a first image obtained by rendering the structure in accordance with a predetermined coordinate system;
  - a second designation task that designates a second partial region corresponding to the first partial region for a second image including a captured image obtained by capturing the wall surface of the structure;
  - a conversion task that converts an image of the second partial region into an image complying with the predetermined coordinate system based on a coordinate of the first partial region in the first image and a coordinate of the second partial region in the second image; and
  - a detection task that detects the defect generated on the wall surface of the structure from the image converted by the conversion task,
- wherein the first designation task sequentially designates different first partial regions in the first image, and
- wherein the first designation task designates a first partial region at a (k+1)th time based on a first partial region designated at a kth time, wherein k is integer greater than 0.

* * * * *